United States Patent Office 3,545,859
Patented Dec. 8, 1970

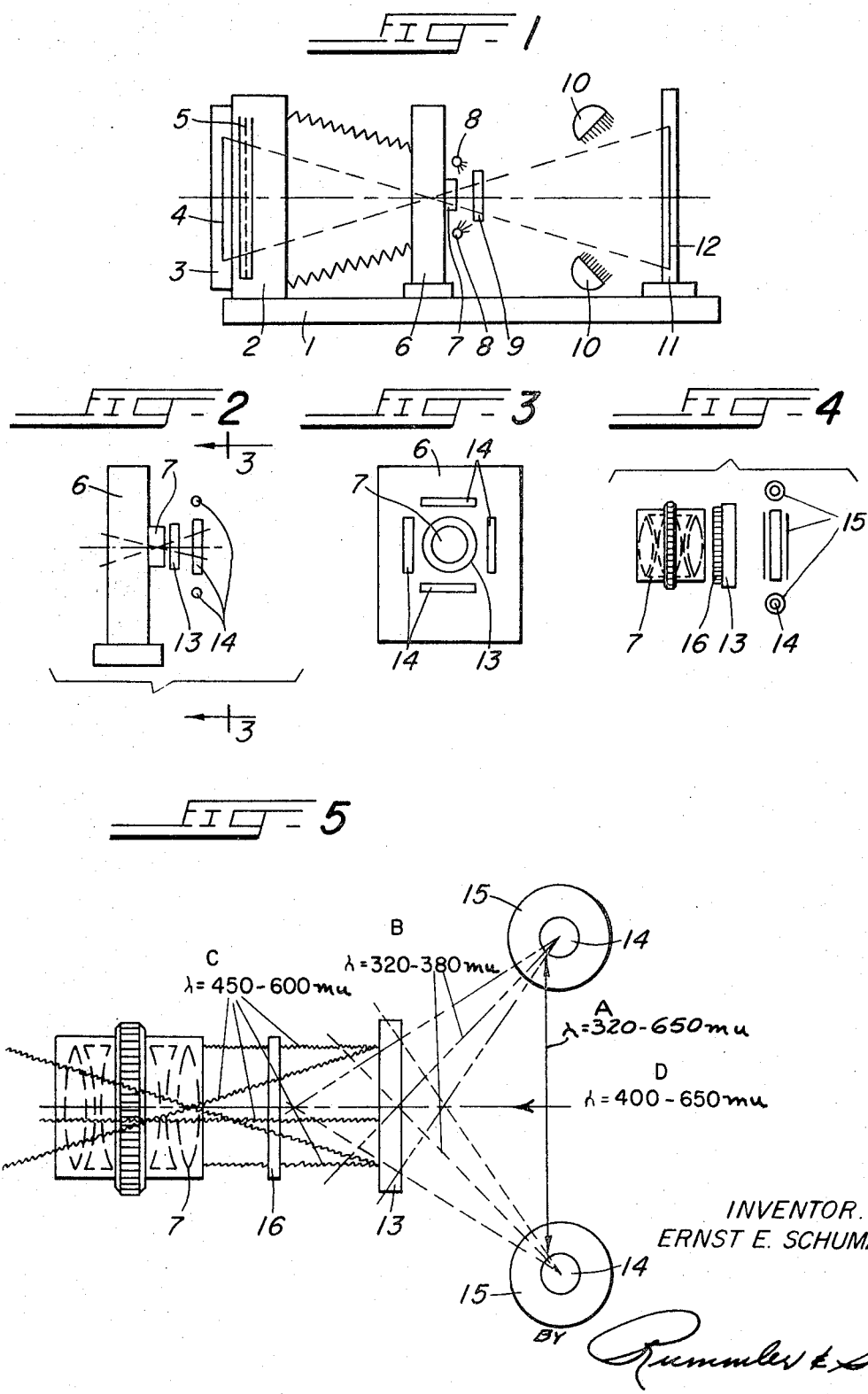

3,545,859
FLASH MEANS FOR PROCESS CAMERAS AND ENLARGERS
Ernst E. Schumacher, Postfach 3113,
Frankfurt am Main, Germany
Filed May 20, 1968, Ser. No. 730,560
Claims priority, application Germany, May 25, 1967,
K 62,379
Int. Cl. G03b 27/76; G01n 21/16, 21/38
U.S. Cl. 355—71                                    8 Claims

ABSTRACT OF THE DISCLOSURE

A supplemental flash-exposure system for process cameras and enlargers, including a clear transparent fluorescent member mounted in the path of the light rays passing from the object to a lens focused on the light sensitive image plane, and a momentarily energized source of radiation for activating fluorescence in the fluorescent element. The radiation sources are located laterally of the path of the image producing light rays to avoid the rays from the radiation sources reaching the lens; and in one embodiment of the invention, a filter capable of absorbing rays from the radiation sources is disposed between the fluorescent element and the lens.

BACKGROUND OF THE INVENTION

A number of reproduction processes and methods for varying the gradation when making enlargements call for a preliminary fogging (or "dodging") of the photographic emulsion in order to extend the reproducible density range. To accomplish this operation it is often sufficient to give a diffused additional exposure, for instance by means of a light source located in proximity of the lens. For other processes, however, for instance for halftone shots with glass crossline screens, it is indispensable that the light for such a flash exposure has the same direction as the image light passing through the lens. In most cases, therefore, process cameras and enlargers are equipped with additional flash light sources adapted to be swung in front of the lens. These light sources, comprise a lamp housing and an opal glass plate and are used with the existing lens and shutter, but the flash and main exposures can not be made simultaneously.

The principal object of the present invention, therefore, is to provide a flash installation or system to be used on process cameras and enlargers, which makes it possible to obtain flash and main exposures at the same time. Such a combination has the advantage of cutting down exposure times considerably; and cameras or enlargers equipped with such simultaneous exposure means may also be used successfully for programmed exposures.

SUMMARY OF THE INVENTION

A flash installation or system according to the present invention comprises a clear transparent fluorescent element in the imaging path of rays entering the lens of the photographic reproduction device. This element is associated with at least one special source of radiation, located outside of the imaging path of rays, which activates the fluorescense of the said element.

The fluorescent element is preferably constituted by a faultless plane-parallel glass plate, or foil of plastic or gelatin material, and it may be mounted in front of the lens, in the lens barrel, or behind the lens. The fluorescence of the said plate or foil, activated by suitable radiation, preferably ultra-violet radiation, makes it possible to give a flash exposure without adversely affecting the main exposure.

My invention takes into account that the activating radiation should not shine directly into the lens and thus into the camera as, otherwise, stray light or fogging might occur. This means that the best photographic results cannot be obtained unless the mainly invisible activating radiation, for instance ultra-violet radiation, is converted by the action of fluorescence into visible blue, green or yellow light.

Thus, although various embodiments of the invention present themselves, it is preferred that the sources of radiation be fitted in such a way that the radiation does not strike the lens but only the fluorescent plate or foil, placed with sufficient clearance in front of the lens.

Another embodiment of my invention consists of an assembly wherein the utlra-violet radiation for activating the fluorescence of the flashing element is directed toward the lens, in front of which a fluorescent plate is mounted. Experience has shown that such fluorescent plates absorbed a major part of ultra-violet radiation, but since the light sensitive emulsion should be shielded from any remaining ultra-violet radiation it is recommended to use, in addition, an ultra-violet ray absorbing filter. This filter may be interposed between the fluorescent plate and the lens, or it may be placed in the lens barrel or at the rear of the lens.

DESCRIPTION OF THE DRAWINGS

FIG. 1 is a schematic side elevation of a process camera provided with a flash exposure system according to the present invention;

FIG. 2 is a schematic side view of the lens holder of FIG. 1 showing a modified arrangement of the flash exposure means;

FIG. 3 is an end view of the same as taken on the line 3—3 of FIG. 2, to show the disposition of the radiation means relative to the fluorescent elements;

FIG. 4 is an enlarged view of the lens and flash exposure means of FIG. 2 showing the use of an ultra-violet ray filter between the lens and the fluorescent elements; and FIG. 5 is an enlarged view like that of FIG. 4 showing the wave lengths of light rays involved in the normal operation of the present invention for process camera work.

DESCRIPTION OF THE PREFERRED EMBODIMENTS

FIG. 1 illustrates the set-up, according to my invention, of a camera for half-tone work with at least two partial exposures, i.e., a "flash" exposure to produce a small core in each dot over the entire surface of the photographic emulsion and a "main" exposure for producing a half-tone negative from the original copy. As shown, the camera bed 1 supports a camera back 2 having an attached plate holder 3 accommodating the light sensitive material 4 in front of which a half-tone screen 5 is inserted in the camera back, all in a more or less conventional manner, the distance between the photographic emulsion and the screen being adjustable and depending on the line ruling of the screen. Lens holder 6 supports a lens 7 and a plurality of ultra-violet light sources 8 are mounted around the lens, in laterally spaced relation therewith, so that the rays which activate fluorescence of the clear transparent fluorescent element 9 are directed forwardly toward the element 9 and away from the lens 7, the element 9 being mounted in forwardly spaced relation with the lens. The main camera lamps 10 are directed toward the copy holder 11 which supports the copy 12 in position to be photographed and it will be understood that both light sources 8 and 10 will have suitable switch means for selective energization at the will of the operator.

As shown in FIGS. 2 and 3 the light sources are tubular lamps 14, arranged as a rectangular frame forwardly of the fluorescent element 13, on the copyholder side thereof, and in this case the light rays from the lamps 14, which activate the fluorescent element 13, are directed rearwardly toward the lens 7, although at a wide angle relative to the path of the imaging rays. This arrangement makes possible the use of a smaller fluorescent element than would be required for the arrangement of FIG. 1. This arrangement of FIG. 2, however, requires precautionary measures to assure that no ultra-violet rays enter the lens.

Such precautionary measures are illustrated by FIG. 4 wherein each of the lamps or light sources 14 is fitted with a tubular filter jacket 15 whose light transmission is limited to wave lengths under 380 m$\mu$. Also, the fluorescent element 13 has associated with it, on the lens side of the element, an ultra-violet ray absorbing filter 16 which allows only wave lengths of more than 400 m$\mu$ to pass through it. This protects the film or plate 4 in the camera back from becoming exposed by the ultra-violet light which activates the fluorescent element for the desired "flash" exposure.

FIG. 5 shows the nature of the light waves ordinarily involved in reproduction processes and illustrates the co-action of the filter 16 with the fluorescent element or plate 13 in a system such as that illustrated by FIG. 4. As shown in FIG. 5 the lamp 14, normally transmitting light rays A in the range of 320 to 650 m$\mu$, is enclosed in the filter jacket 15 which transmits only rays B which are in the ultra-violet range of 320 to 380 m$\mu$. The ultra-violet rays cause the element 13 to fluoresce producing light rays C, in the blue-green range of 450 to 600 m$\mu$, which light rays upon passing through the lens 7 to the light sensitive material 4, will provide an overall "flash" exposure as an addition to the normal rays D reflected by the copy 12 and in the range of 400 to 650 m$\mu$. With this arrangement both the main exposure and the flash exposure may be made at the same time.

It will be understood that the fluorescent element 13 may bep rovided with a vacuum-deposited ultra-violet absorbing coating on the side of the element nearest the lens, as an additional safety factor or as a substitute for the filter 16, in arrangements such as that shown in FIGS. 4 and 5.

Also in radiator arrangements such as those shown in FIGS. 2 to 5 inclusive, the preferred light source is a mercury vapor lamp or tube inclosed in another tube which transmits ultra-violet and absorbs all visible light. These lights have practically no warming-up period so that no additional shutter for the radiators is required. In the case of high pressure mercury vapor lamps, however, which require a warm-up period, a shutter for the lamps is necessary to ensure a correct dosage of flash exposure upon completion of the warm-up period.

It will also be understood that it is possible to use pulsed xenon lamps or stroboscopic flashlights which do not require warming up and hence are perfectly suited for immediate dosage of flash exposure.

Particular advantages of my improved "flash" exposure system invention reside in the fact that no light source need be pivoted in front of the lens, which simplifies the design of process cameras and reduces the overall exposure time by that required in the past for pivoting the lamp into working position, then performing the flashing operation, and then swinging the lamp out of the path of the imaging rays. Thus my improved system is particularly suited for use on cameras provided with a programmed exposure-cycle system.

Although several embodiments of my invention have been herein shown and described it will be understood that details of the arrangements shown may be altered or omitted without departing from the spirit of the invention as defined by the following claims.

I claim:

1. A flash means, for lens equipped process cameras and enlargers, comprising a clear transparent fluorescent element interposed in the imaging path of rays from the subject to be reproduced, and at least one source of radiation for activating fluorescense of said fluorescent element, said source of radiation being located laterally outside of the said imaging path of rays.

2. A flash means according to claim 1 wherein the fluorescent element is a member capable of producing light in the range of blue to yellow when exposed to ultra-violet radiation.

3. A flash means according to claim 2 wherein the fluorescent element is in the form of a glass plate.

4. A flash means according to claim 1 wherein the source of radiation is a gas discharge lamp and a filter is interposed between the lamp and the fluorescent element to block out all but ultra-violet rays from reaching the fluorescent element.

5. A flash means according to claim 1 including an ultra-violet ray absorbing filter disposed in the imaging path of rays on the lens-side of the fluorescent element.

6. A flash means according to claim 5 wherein the ultra-violet ray absorbing filter is applied directly to the lens-side surface of the fluorescent element.

7. A flash means according to claim 5 wherein the ultra-violet absorbing filter medium is vacuum-deposited onto the lens-side surface of the fluorescent element.

8. A flash means according to claim 1 wherein the fluorescent element is in the form of a glass plate capable of producing light in the blue to yellow range when exposed to ultra-violet radiation, and an ultra-violet absorbing filter medium has been vacuum-deposited on one face of the fluorescent element.

References Cited
UNITED STATES PATENTS 3,110,805   11/1963   Currie _____ 35—67X JOHN M. HORAN, Primary Examiner RICHARD A. WINTERCORN, Assistant Examiner U.S. Cl. X.R.

250—71